(12) United States Patent
Friedman (10) Patent No.: US 12,185,352 B2
(45) Date of Patent: Dec. 31, 2024

(54) WI-FI FREQUENCY ADJUSTMENT FOR SPUR MITIGATION

(71) Applicant: Intel Corporation, Santa Clara, CA (US)

(72) Inventor: Avishay Friedman, Petach Tikva (IL)

(73) Assignee: Intel Corporation, Santa Clara, CA (US)

( * ) Notice: Subject to any disclaimer, the term of this patent is extended or adjusted under 35 U.S.C. 154(b) by 477 days.

(21) Appl. No.: 17/687,711

(22) Filed: Mar. 7, 2022

(65) Prior Publication Data

US 2022/0408449 A1   Dec. 22, 2022

(30) Foreign Application Priority Data

Jun. 22, 2021   (DE) ..................... 10 2021 116 127.4

(51) Int. Cl.
*H04W 72/542* (2023.01)
*H04L 27/00* (2006.01)
*H04W 72/0453* (2023.01)

(52) U.S. Cl.
CPC ....... *H04W 72/542* (2023.01); *H04L 27/0014* (2013.01); *H04W 72/0453* (2013.01); *H04L 2027/0026* (2013.01)

(58) Field of Classification Search
None
See application file for complete search history.

(56) References Cited

U.S. PATENT DOCUMENTS

| | | | |
|---|---|---|---|
| 9,935,794 B1* | 4/2018 | Cao | H04L 5/0048 |
| 2011/0090973 A1* | 4/2011 | Mishra | H04L 27/2688 375/343 |
| 2015/0023335 A1* | 1/2015 | Vermani | H04L 27/261 370/338 |
| 2015/0110231 A1* | 4/2015 | Alexander | H04L 27/2675 375/362 |
| 2015/0281987 A1* | 10/2015 | Mozes | H04L 27/2656 375/349 |
| 2017/0105215 A1* | 4/2017 | Li | H04B 7/0452 |
| 2018/0316467 A1* | 11/2018 | Zhu | H04L 27/2603 |
| 2021/0067212 A1* | 3/2021 | Pierrugues | H04B 17/3913 |
| 2021/0399933 A1* | 12/2021 | Wu | H04L 27/2621 |

\* cited by examiner

*Primary Examiner* — Liem H. Nguyen
(74) *Attorney, Agent, or Firm* — VIERING, JENTSCHURA & PARTNER MBB (57) ABSTRACT

An apparatus of a Wi-Fi station (STA), the apparatus including a radio frequency (RF) interface, and one or more processors coupled to the RF interface configured to: receive a first periodic training field and a second periodic training field of a preamble of a data packet; compare the first periodic training field of the preamble with the second periodic training field of the preamble; determine a first spurious tone parameter based on the comparison; receive a transmission frame of the data packet; determine a second spurious tone parameter based on the transmission frame of the data packet; and generate a frequency adjustment based on the first spurious tone parameter and the second spurious tone parameter.

20 Claims, 5 Drawing Sheets

WI-FI FREQUENCY ADJUSTMENT FOR SPUR MITIGATION

RELATED APPLICATIONS

The present application claims priority to German Application 10 2021 116 127.4, which was filed on Jun. 22, 2021, the contents of which are incorporated by reference herein in its entirety.

TECHNICAL FIELD

Various aspects relate generally to methods and systems for aiding Wi-Fi spur mitigation by adjusting center frequencies.

BACKGROUND

Wireless networks using Wi-Fi technology may suffer from period noise or spurs. Wi-Fi technology may operate according to Institute of Electrical and Electronics Engineers (IEEE) 802.11 standards. The energy of periodic noise is concentrated in a very narrow bandwidth. The periodic noise may degrade a Wi-Fi receiver's performance. The source of the periodic noise may come from a frequency or harmonic of a clock, phase locked loop (PLL), converter, etc. The problem is amplified in small form-factor devices with multiple clock sources.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

The following detailed description refers to the accompanying drawings that show, by way of illustration, specific details and aspects in which the invention may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "lesser subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers.

The term "station" or "STA" as utilized herein refers to a network device that is capable of using WLAN/Wi-Fi technology (e.g., according to any IEEE 802.11 standard). "STA" can include mobile or immobile wireless communication devices, including Access Points (APs), User Equipments (UEs), smart televisions, tablets, laptops, personal computers, wearables, multimedia playback and other handheld or body-mounted electronic devices, consumer/home/office/commercial appliances, vehicles, and any other electronic device capable of Wi-Fi communications.

The term "W-Fi sensing" (also referred to as "wireless sensing" or "WLAN sensing") may refer to a usage of wireless technology to detect changes in an environment. For example, WLAN sensing is the use of IEEE 802.11 technology to enable WLANs and electronic devices with WLAN capability to obtain channel measurements that characterize the environment in which they are located, thus gaining spatial and contextual awareness of their surroundings, and enable applications such as presence and proximity detection, device-free positioning, and gesture classification, among many others. Wi-Fi sensing applications may support in both 2.4/5/6 GHz and 60 GHz.

The term "model" as used herein may be understood as any kind of algorithm, which provides output data from input data. For example, an algorithm generating or calculating output data from input data.

Some aspects may be used in conjunction with devices and/or networks operating in accordance with existing IEEE 802.11 standards. For example, IEEE 802.11-2016 and IEEE 802.11az, and/or future versions and/or derivatives thereof. Some aspects may be used in conjunction with a WLAN, e.g., a WiFi network or any other suitable wireless communication network, for example, a wireless area network, a "piconet", a WPAN, a WVAN for example.

Additionally, devices and/or networks operating in accordance with existing technology and/or protocols, e.g., 3rd Generation Partnership Project (3GPP), 3GPP Long Term Evolution (LTE), WFA Peer-to-Peer (P2P) specifications (WiFi P2P technical specification, version 1.7, Jul. 6, 2016), Radio Frequency (RF), Infrared (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (ETDMA), General Packet Radio Service (GPRS), Extended GPRS, Code-Division Multiple Access (CDMA), Wideband CDMA (WCDMA), CDMA 2000, singlecarrier CDMA, multi-carrier CDMA, Multi-Carrier Modulation (MCM), Discrete Multi-Tone (DMT), Bluetooth®, Global Positioning System (GPS), Global Navigation Satellite System (GNSS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), and/or future versions and/or derivatives thereof, may be used in conjunction with some aspects.

Figure 1:
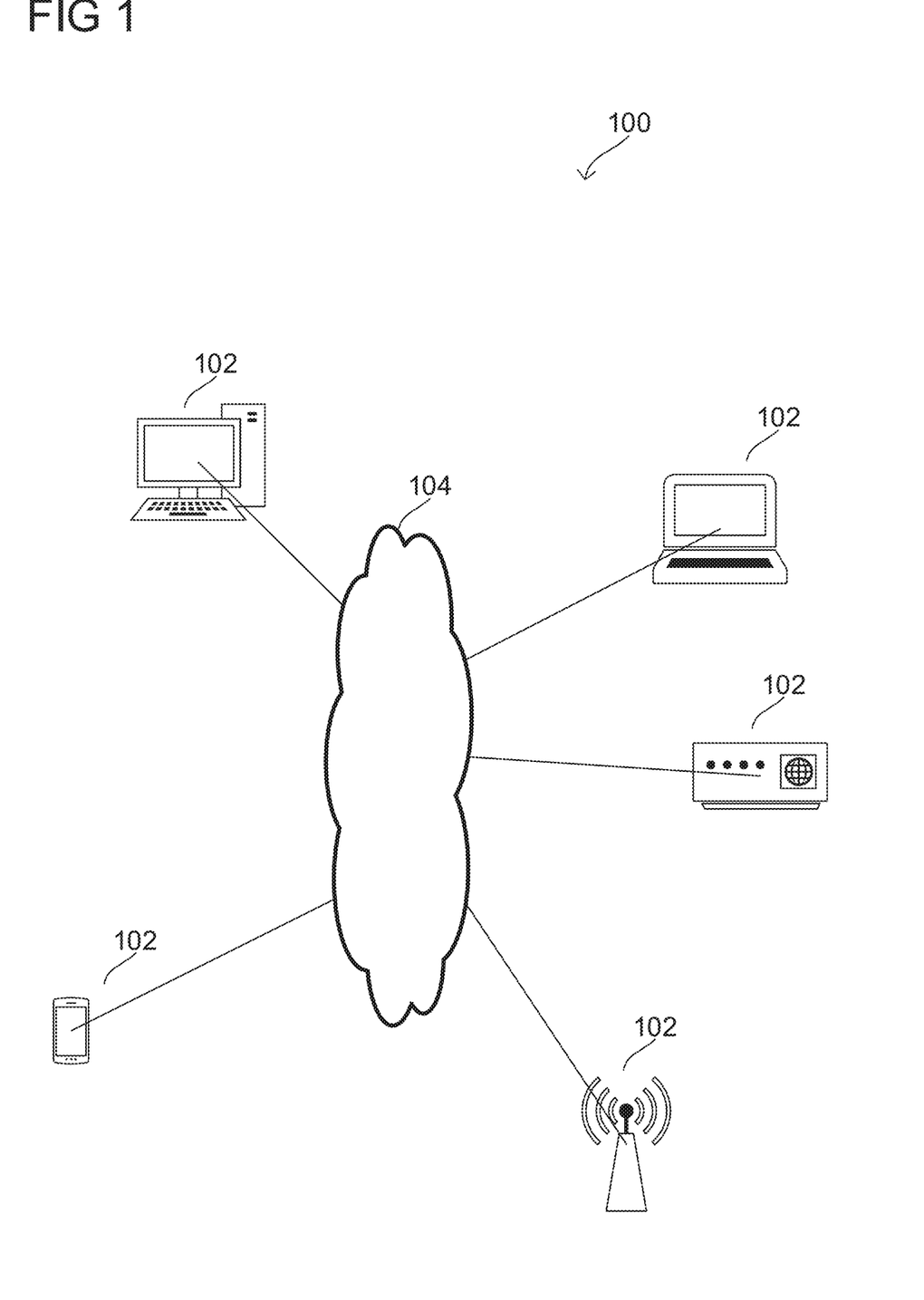
FIG. 1 shows an exemplary wireless communication channel network.

FIG. 1 depicts an exemplary network for wireless communication according to some aspects. Wireless communication network 100, such as a Wi-Fi network, may include one or more wireless communication devices 102 communicating via wireless medium 104. Wireless communication device 102 may be capable of communicating content, data, information and/or signals via a wireless medium 104. Devices 102 may operate as, and/or perform the functionality of one or more Wi-Fi STAs.

Wireless medium 104 may include a radio channel, cellular channel, GNSS channel, UWB channel, Global Positioning System GPS channel, RF channel, Wi-Fi channel, Infrared (IR) channel, among others.

Wireless communication medium 104 may include a 2.4 GHz frequency band, 5 GHz frequency band, millimeter-Wave (mmWave) frequency band, 60 GHz frequency band, Sub1 GHz (S1G) band, and/or one or more other wireless communication frequency bands.

Figure 2:
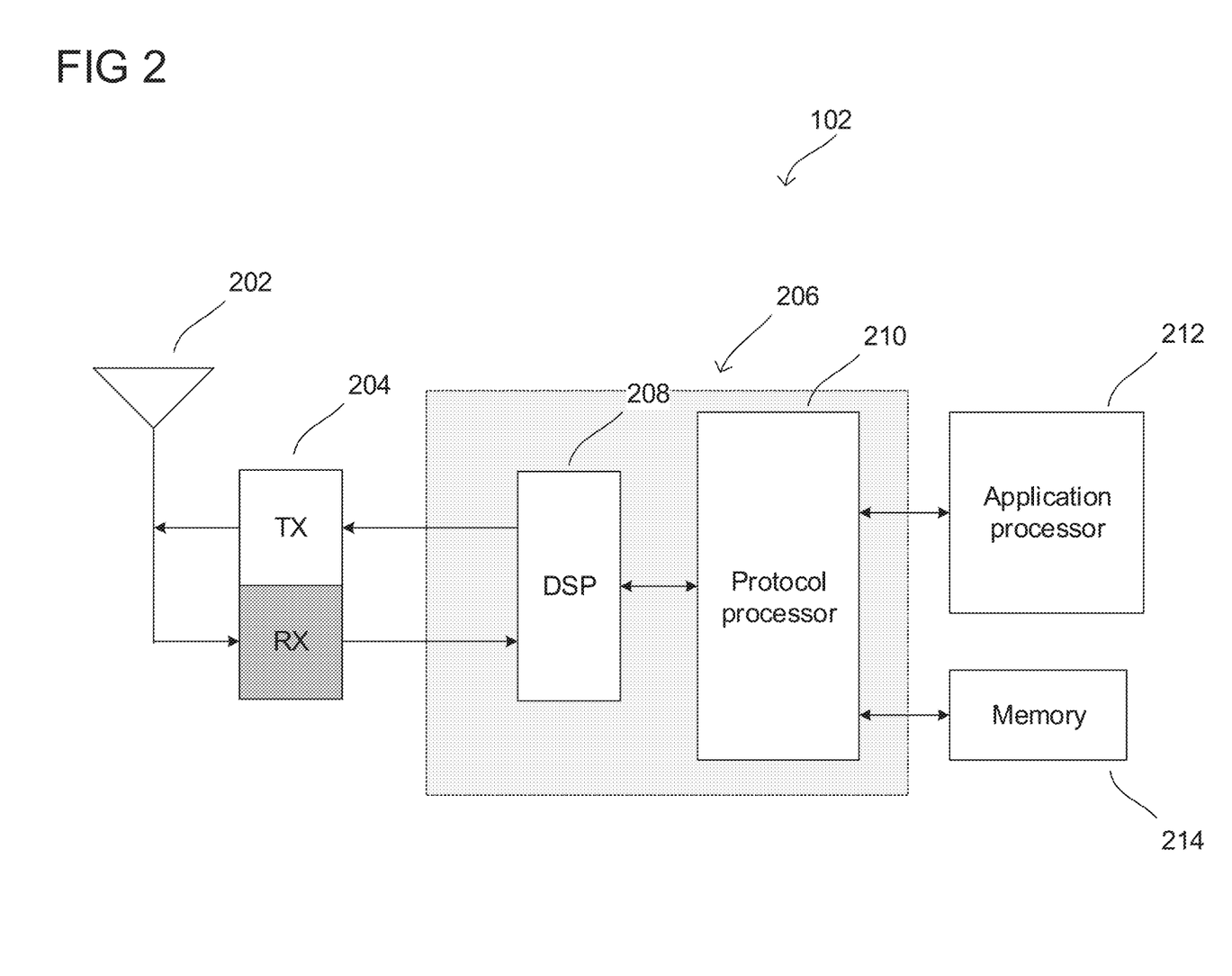
FIG. 2 shows an exemplary wireless communication device.

FIG. 2 shows an internal configuration of wireless communication device 102 according to some aspects. Wireless communication device 102 may include antenna system 202, transceiver 204, baseband modem 206 (including digital signal processor 208 and protocol controller 210), application processor 212, and memory 214. Although not explicitly shown in FIG. 2, in some aspects wireless communication device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Wireless communication device 102 may transmit and receive radio signals on one or more radio access networks. Baseband modem 206 may direct this communication functionality of device 102 according to the communication protocols associated with each radio access network. Baseband modem 206 may thus control antenna system 202 and transceiver 204 to transmit and receive radio signals according to the formatting and scheduling parameters for the communication protocols. In some aspects where device 102 is configured to operate on multiple radio communication technologies, device 102 may include separate communication components for each supported radio communication technology (e.g., a separate antenna, RF transceiver, digital signal processor, and controller).

Device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, transceiver 204 may receive analog radio frequency signals from antenna system 202 and perform analog and digital RF front-end processing on the analog radio frequency signals to produce digital baseband samples (e.g., In-Phase/Quadrature (IQ) samples) for baseband modem 206. Transceiver 204 may include analog and digital reception components including amplifiers (e.g., Low Noise Amplifiers (LNAs)), filters, RF demodulators (e.g., RF IQ demodulators)), and analog-to-digital converters (ADCs), with which transceiver 204 may convert the received radio frequency signals to digital baseband samples. In the transmit (TX) path, transceiver 204 may receive digital baseband samples from baseband modem 206 and perform analog and digital RF front-end processing on the digital baseband samples to produce analog radio frequency signals for antenna system 202 to wirelessly transmit. Transceiver 204 may include analog and digital transmission components including amplifiers (e.g., Power Amplifiers (PAs), filters, RF modulators (e.g., RF IQ modulators), and digital-to-analog converters (DACs), which transceiver 204 may utilize to mix the digital baseband samples received from baseband modem 206 and produce the analog radio frequency signals for wireless transmission by antenna system 202. In some aspects baseband modem 206 may control the radio transmission and reception of transceiver 204. This may include specifying radio frequencies for transceiver 204 to transmit or receive on.

As shown in FIG. 2, baseband modem 206 may include digital signal processor 208, which may perform physical layer (PHY; Layer 1) transmission and reception processing. In the transmit path, digital signal processor 208 may prepare outgoing transmit data (from protocol controller 210) for transmission via transceiver 204. In the receive path, digital signal processor 208 may prepare incoming received data (from transceiver 204) for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions. The one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Device 102 may be configured to operate according to one or more communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the communication components of device 102 (antenna system 202, transceiver 204, and digital signal processor 208) according to the communication protocols of each supported radio communication technology. In some aspects, protocol controller 210 may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of device 102 to transmit and receive communication signals according to the protocol stack control logic in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to transfer application layer data to and from device 102 with the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Device 102 may also include application processor 212 and memory 214. Application processor 212 may be a CPU configured to handle the layers above the protocol stack, including the transport and application layers. Application processor 212 may be configured to execute various applications and/or programs of device 102 at an application layer of device 102. These applications and/or programs may include an operating system (OS), a user interface (UI) for supporting user interaction with device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to transceiver 204. Transceiver 204 may then process the digital baseband samples to convert the digital baseband samples to analog RF signals, which transceiver 204 may wirelessly transmit via antenna system 202. In the receive path, transceiver 204 may receive analog RF signals from antenna system 202 and process the analog RF signals to obtain digital baseband samples. Transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of device 102, such as a hard drive or another such permanent memory device. Although not explicitly depicted in FIG. 2, the various other components of device 102 shown in FIG. 2 may additionally each include integrated permanent and non-permanent memory components, such as for storing software program code, buffering data, etc.

Spur noise can degrade wireless signal reception. Filtering spurs or estimating spur parameters such as frequency, phase, and/or gain can be used to cancel, eliminate, or mitigate spur noise.

In the time domain (TD), a band-stop filter may filter signals at a frequency range encompassing the spur noise frequency. In the frequency domain (FD) of an orthogonal frequency division multiplexing (OFDM) system, reducing the log-likelihood ratio (LLR) of noisy tones decreases the impact on the overall codeword decoding. However, TD filtering and FD tone scaling attenuate the signal strength. Reduced signal strength causes a decline in signal-to-noise ratio (SNR) and causes residual performance degradation which increases with the spur level and the number of spurs.

Spur noise can also be mitigated by estimating spur parameters based on channel estimation. For example, estimating an average time using a least mean square (LMS) or recursive least square (RLS) algorithm. It should be noted that other algorithms can also be used for channel estimation. The spur noise is cancelled using the estimated spur parameters. However, average time based spur estimation is not suitable for low power receiver, such as those used for Wi-Fi, due to frequent on/off (slotted) operation. The spur gain and phase are often different every wake-up of the lineup and there is not enough time (or processing gain) to get a reliable estimation of the gain or phase spur parameters.

Additionally, one may estimate spur parameters using data reception. For example, spur parameters may be estimated by first decoding the received data packet and subtracting it from the received signal to get the 'pure' noise. The spur parameters are estimated based on the noise. However, data-aided schemes are not capable of handling high level spurs due to the high bit error rate (BER). The spur causes slicing-errors which introduces errors into the demodulated data. Therefore, any estimated spur parameters based on that data are not reliable.

Improved methods of estimating spur parameters and cancelling spur noise based on the estimated parameters may be desired. Estimating spur parameters using Wi-Fi preambles of a data packet may offer an improved method for cancelling spur noise. Using the Wi-Fi preamble takes advantage of the built-in periodicity to initially detect and estimate spur parameters. For example, short training fields (STF) have a duration of 0.08 microseconds and long training fields (LTF) have a duration of 3.2 microseconds. The periodicity of each type of training field is used to detect and/or estimate spur parameters.

Using the initial estimated spur parameters based on the Wi-Fi preamble of a data packet, a data-aided scheme is used to track variations in the spur parameters over the length of the data packet. Because the spur parameters based on the Wi-Fi preamble have a low error, a data-aided spur estimation scheme can effectively track spur parameter variations based on the initial spur parameters. The estimated spur parameters and tracked variations of the spur parameters can be combined to adjust a center frequency for future data packets. Changing the center frequency from data packet to data packet in order to adjust the spur's offset minimizes the error caused by the spur. Altogether we can eliminate any spur level without affecting the desired signal and handle multiple spurs concurrently.

Spur robustness is crucial for connectivity performance in modern platforms which has a lot of clock sources in small form-factors. The ability to mitigate spur noise is desired to minimize integration efforts in chip design.

Orthogonal frequency-division multiple access (OFDMA) divides a bandwidth into smaller subcarriers. Transmission in smaller subcarriers are more sensitive to spur noise than larger subcarriers. For example, transmission in a 78.125 kHz subcarrier is more sensitive to spur noise than transmission in a 312.5 kHz subcarrier. If a spur is detected in one subcarrier, a frequency adjustment based on the detected spur may be made for transmission in the next sub carrier.

Figure 3:
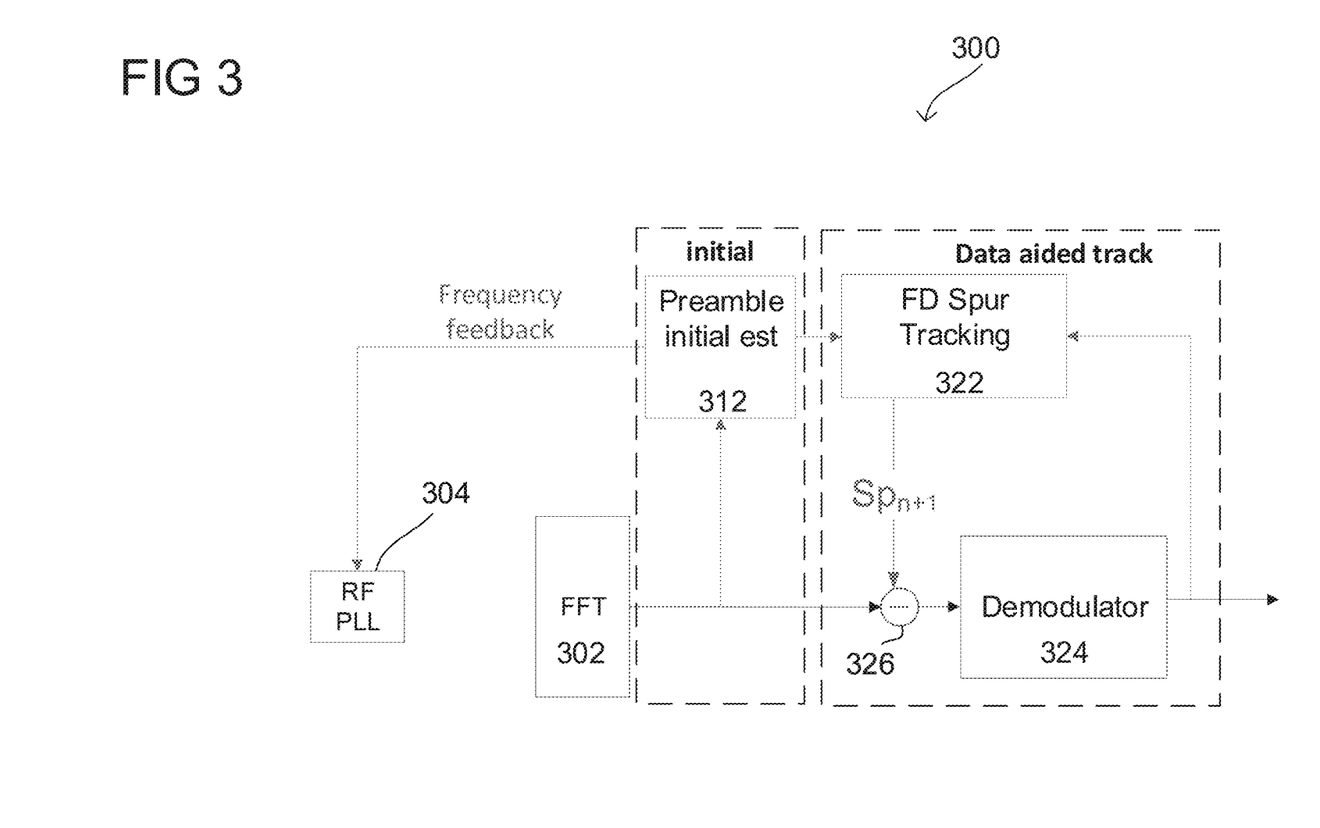
FIG. 3 shows an exemplary block diagram for spur detection.

FIG. 3 shows a block diagram of spur estimator 300 for spur estimation. Fast Fourier transform (FFT) 302 may generate a discrete Fourier transform (DFT) of Wi-Fi packet. The DFT may include the Wi-Fi packet's frequency spectrum based on signal parameters. The DFT may include information of the frequency, phase, and amplitude of the component sinusoids of the Wi-Fi packet. The DFT may also include a determined frequency response for processing the Wi-Fi packet in the frequency domain. At FFT 302, the DFT may be sent to preamble estimator 312 for estimating the spur of the preamble component of the Wi-Fi packet. Preamble estimator 312 analyzes the training fields of the preamble to determine spur parameters, such as frequency, phase, and amplitude.

Every Wi-Fi packet begins with a preamble which consists of 8 microsecond legacy STFs and/or 8 microsecond LTFs. The STF may include 10 repetitions of an 0.8 microsecond signal. The LTF may include 2.5 repetitions of a 3.2 microsecond signal.

By exploiting the periodicity of the training fields in the preamble, preamble estimator 312 can detect the presence of spurs and estimate the spurs' parameters. Note that in many cases the frequency of the spur is a known value.

Preamble estimator 312 may determine spur parameters in the TD in part by using the following formula:

$$s_n = \beta e^{j\omega_0 n}$$

Where $\beta$ is a complex spur parameter, such as phase and amplitude, and $\omega_0$ is the spur frequency and n is time index.

Preamble estimator 312 may determine spur parameters in the FD in part by using the following formulas:

$$S_k = \beta \sum_n e^{j\omega_0 n} e^{-j2\pi k \frac{n}{N}} = \beta \sum_n e^{j\omega_0 n} e^{-j2\pi k \frac{n}{N}}$$

$$S_k = \beta \frac{1 - e^{j2\pi\left(\frac{f_0}{f_s}N - k\right)}}{1 - e^{j2\pi\left(\frac{f_0}{f_s} - \frac{k}{N}\right)}} \triangleq \beta_k$$

Where k is the tone of the DFT of the received signal.

Preamble estimator 312 may also determine the received signal (Wi-Fi packet) in tone k of the first preamble replica by using the following formula:

$$R_k^{LTF\_0} \triangleq P_k + \beta_k$$

Where $P_k$ is the transmitted preamble in tone k, and $\beta_k$ is a complex spur parameter.

Preamble estimator 312 may also determine the received signal in tone k of the second preamble replica by using the following formulas:

$$R_k^{LTF\_1} = P_k + \beta_k e^{j2\pi\left(\frac{f_0}{f_s}T\right)}$$

$$\text{diff} = R_k^{LTF\_0} - R_k^{LTF\_1} = \beta_k^{LTF\_0} - \beta_k^{LTF\_0} e^{j2\pi\left(\frac{f_0}{f_s}T\right)} = \beta_k\left(1 - e^{j2\pi(f_{spur}T_{sym})}\right)$$

$$\hat{\beta}_k = \frac{R_k^{LTF\_0} - R_k^{LTF\_1}}{\left(1 - e^{j2\pi(f_{spur}T_{sym})}\right)} = \frac{LTFdiff}{\left(1 - e^{j2\pi(f_{spur}T_{sym})}\right)}$$

And the variance of the estimation is determined by the following formula:

$$\text{var}(\beta_k) = \frac{2\sigma^2}{\left|\left(1 - e^{j2\pi(f_{spur}T_{sym})}\right)\right|^2}$$

Preamble estimator 312 may also determine by subtracting the two FD replicas of the 0.8 microsecond STF and get the spur estimation:

$$\widehat{Spur}_k = \frac{R_k^{STF_0} - R_k^{STF_1}}{\left(1 - e^{j2\pi(f_{spur}T_{sym,STF})}\right)} = \frac{STFdiff}{\left(1 - e^{j2\pi(f_{spur}T_{sym,STF})}\right)}$$

Note that the fast Fourier transform (FFT) can be done over TD subtraction or by subtracting the FD representation.

Preamble estimator 312 may similarly determine spur parameters with LTF replicas as shown by the following formula:

$$\widehat{Spur}_k = \frac{R_k^{LTF_0} - R_k^{LTF_1}}{\left(1 - e^{j2\pi(f_{spur}T_{sym,STF})}\right)} = \frac{LTFdiff}{\left(1 - e^{j2\pi(f_{spur}T_{sym,LTF})}\right)}$$

Note that in the case when the spur frequency is unknown, it can be estimated using an algorithm. For example, the multiple signal classification (MUSIC) algorithm.

The spur parameters determined at preamble estimator 312 are forwarded to spur tracker 322. The spur parameters may vary slowly over the packet. Spur tracker 322 uses the initial spur parameters from preamble estimator 312 as a basis for determining the changes in the spur parameters over the duration of the Wi-fi packet. Spur tracker 322 estimation accuracy is dependent on the accuracy of the initial spur parameter estimation of 312. Spur tracker 322 tracks the spur parameters over the data portion of the Wi-Fi packet in the relevant tones of the FD. Spur tracker 322 may compare spur parameter estimates for a data portion of the Wi-Fi packet with spur parameter estimates of the preamble portion of the Wi-Fi packet to determine a change in the spur parameters. Additionally, spur tracker 322 may compare spur parameter estimates from different times of the data portion of the Wi-Fi packet to determine a change in the spur parameters.

In order to keep updated estimates of the spur parameters, spur tracker 322 may use the following data aided formula:

$$e_k = R_k - H_k \widehat{x_k}$$

Where $R_k$ is the received signal, $H_k$ is the channel, and $\widehat{x_k}$, is the estimated transmitted signal.

Assuming there are no slicing errors, spur tracker 322 may determine $e_k$ using the following formula:

$$e_k = n_k + \beta_k$$

Where $n_k$ is the thermal noise, and $\beta_k$ is a spur parameter.

Spur tracker 322 may estimate the spur in tone k, for symbol M using the following formula:

$$\widehat{spur}_k^M = \frac{1}{M} \sum_{m=0}^{M-1} e_k^m e^{j2\pi(f_{spur} T_{sym}(M-m))}$$

Where implementing the mean operation may be done through an alpha filter, least mean square (LMS), or recursive least square (RLS) algorithm, among others.

Note that both in the initial preamble spur parameter estimation and the spur tracking estimation, each tone is treated separately. Alternatively, estimator 300 may also estimate the spur parameters jointly from several tones using the fact that the spur DFT is distributed as a normalized or unnormalized sinc function over the tones.

Based on preamble spur estimation from preamble estimator 312 and the spur estimation updates from spur tracker 322, spur tracker 322 may generate a frequency adjustment to mitigate the spur noise. The spur adjustment may be forwarded to frequency adjuster 326. Frequency adjuster 326 adjusts the frequency of a signal from FFT 302. Frequency adjuster 326 may adjust the frequency of the W-Fi packet signal to counter spur frequency and resulting in a Wi-Fi packet signal that is within a subchannel frequency. The adjusted Wi-Fi packet signal is forwarded to Demodulator 324. Demodulator 324 demodulates the signal according to the DFT from FFT 302 and the frequency adjustment from spur tracker 322 and generates the signal for transmission.

To minimize the initial preamble estimation error for subsequent Wi-Fi packets, spur estimator 300 may also adjust the RF of PLL 304 using frequency feedback from preamble estimator 312 to PLL 304, where PLL 304 is a configurable PLL. The preamble estimation error is dominated by the spur frequency offset from an integer FFT tone. Based on the spur frequency, whether it is estimated or given, and the relative frequency offset from a transmitter, the spur estimator 300 may adjust the center RF to get the spur frequency offset in the region where the initial error is minimized (See FIG. 4). Note that a frequency offset of less than 10 kHz may be sufficient.

Adjusting the RF of PLL 304 mitigates the variance of future Wi-Fi packet signals. Over time, spur estimations may improve resulting in subsequent Wi-Fi packets which are less affected by spur noise.

The preamble spur estimation may be generated based on the LFT or SFT. However, under certain circumstances one may be preferred over the other. The initial preamble spur parameter estimation may be sensitive to the spur offset from integer FFT tone as shown in FIG. 4.

Figure 4:
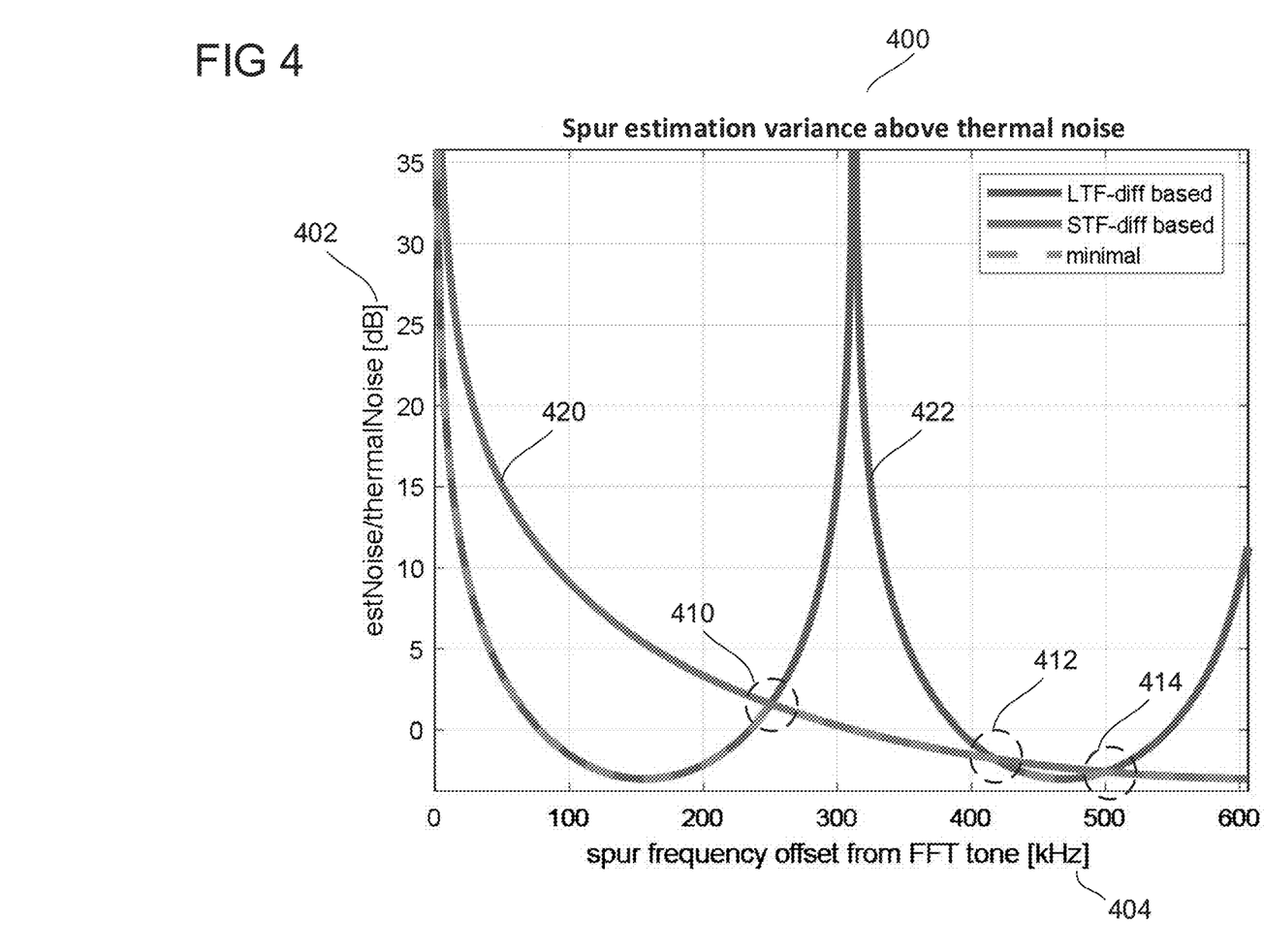
FIG. 4 shows an exemplary variance of spur frequency offset.

FIG. 4 shows a spur estimation variance graph 400. Vertical axis 402 measures estimated spur noise. Horizontal axis 404 measures the spur frequency offset. Line 420 indicates the estimated spur noise for STFs at different frequency offsets. Line 422 indicates the estimated spur noise for LTFs at different frequency offsets. Choosing the training field corresponding to minimal estimated spur noise may reduce the error. For example, line 422 indicates that LTFs produce a smaller error as compared to STFs show by line 420.

Alternatively, a combination of LTFs and STFs may be used to estimate spur parameter to minimize the error. At points 410, 412, and 414 on graph 400 (approximately 250, 420, and 500 kHz respectively), it may be beneficial to switch between training field types. For example, at point 410 the error of spur parameter estimates based on LTFs is rising and the error of spur parameter estimates based on STFs is falling. It may be beneficial to switch from estimating spur parameters based on LTFs to STFs at point 410 (similar to 414). At point 412 the error of spur parameter estimates based on LTFs is falling at a faster rate as compared to those based on STFs is falling. At point 412 it may be beneficial to switch from estimating spur parameters based on STFs to LTFs.

Figure 5:
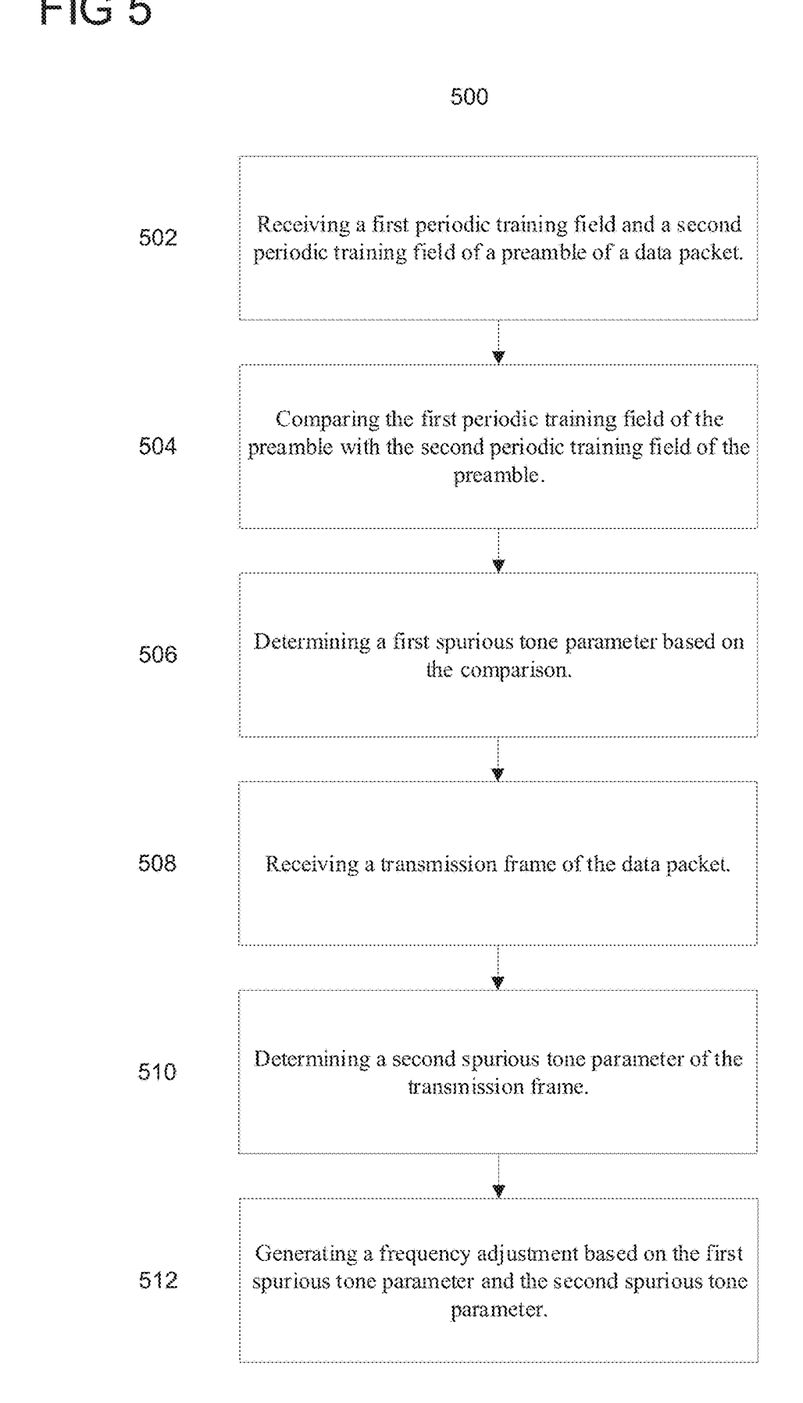
FIG. 5 shows an exemplary method of performing spur mitigation.

FIG. 5 shows an exemplary method of performing spur mitigation. FIG. 5 shows exemplary method 500. As shown in FIG. 5, method 500 includes receiving a first periodic training field and a second periodic training field of a preamble of a data packet (stage 502); comparing the first periodic training field of the preamble with the second periodic training field of the preamble (stage 504); determining a first spurious tone parameter based on the comparison (stage 506); receiving a transmission frame of the data packet (stage 508); determining a second spurious tone parameter of the transmission frame (stage 510; and generating a frequency adjustment based on the first spurious tone parameter and the second spurious tone parameter (stage 512).

Estimating spur parameters for each Wi-Fi packet independently fits the slotted nature of Wi-Fi receivers. It gains from the initial preamble-based estimation so that the data-aided spur tracking has an adequate spur estimation to start from. The combination using differential-STF and differential-LTF with an analog frequency adjustment overcomes the drawback of regular preamble-based estimation.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples disclose various aspects of this disclosure:

In Example 1, an apparatus of a Wi-Fi station (STA), the apparatus including a radio frequency (RF) interface, and one or more processors coupled to the RF interface configured to: receive a first periodic training field and a second periodic training field of a preamble of a data packet; compare the first periodic training field of the preamble with the second periodic training field of the preamble; determine a first spurious tone parameter based on the comparison; receive a transmission frame of the data packet; determine a second spurious tone parameter based on the frame of the data packet; and generate a frequency adjustment based on the first spurious tone parameter and the second spurious tone parameter.

In Example 2, the subject matter of Example 1 may optionally further include, wherein the first periodic training field and the second periodic training field are long training fields.

In Example 3, the subject matter of Examples 1 or 2 may optionally further include, wherein the first periodic training field and the second periodic training field are short training fields.

In Example 4, the subject matter of Examples 1 to 3 may optionally further include, wherein the first periodic training field is a long training field and the second periodic training field is a short training field.

In Example 5, the subject matter of Examples 1 to 4 may optionally further include, wherein the first periodic training field is a short training field and the second periodic training field is a long training field.

In Example 6, the subject matter of Examples 1 to 5 may optionally further include, wherein the first spurious tone parameter is an amplitude of the spurious tone.

In Example 7, the subject matter of Examples 1 to 6 may optionally further include, wherein the first spurious tone parameter is a phase of the spurious tone.

In Example 8, the subject matter of Examples 1 to 7 may optionally further include, wherein the first spurious tone parameter is a frequency of a spurious tone.

In Example 9, the subject matter of Examples 1 to 8 may optionally further include, wherein the frequency of the spurious tone is a predetermined value.

In Example 10, the subject matter of Examples 1 to 9 may optionally further include, wherein the second spurious tone parameter is based on the transmission frame at a first time and the transmission frame at a second time.

In Example 11, the subject matter of Examples 1 to 10 may optionally further include, wherein the second spurious tone parameter is further based on the comparison of the transmission frame between the first time and the second time.

In Example 12, the subject matter of Examples 1 to 11 may optionally further include, wherein the second spurious tone parameter is an amplitude of the spurious tone.

In Example 13, the subject matter of Examples 1 to 12 may optionally further include, wherein the second spurious tone parameter is a phase of the spurious tone.

In Example 14, the subject matter of Examples 1 to 13 may optionally further include, wherein the second spurious tone parameter is a frequency of a spurious tone.

In Example 15, the subject matter of Examples 1 to 14 may optionally be further configured to adjust a center frequency of a further data packet based on the frequency adjustment.

In Example 16, the subject matter of Examples 1 to 15 may optionally further include, wherein the frequency adjustment is based on the frequency of the spurious tone and a frequency offset of a transmitter.

In Example 17, the subject matter of Examples 1 to 16 may optionally further include, a radio frequency (RF) phase locked loop (PLL) configured to determine a frequency offset of the frequency adjustment.

In Example 18, a method including: receiving a first periodic training field and a second periodic training field of a preamble of a data packet; comparing the first periodic training field of the preamble with the second periodic training field of the preamble; determining a first spurious tone parameter based on the comparison; receiving a transmission frame of the data packet; determining a second spurious tone parameter of the transmission frame; and generating a frequency adjustment based on the first spurious tone parameter and the second spurious tone parameter.

In Example 19, the subject matter of Example 18 may optionally further include, wherein the first periodic training field and the second periodic training field are long training fields.

In Example 20, the subject matter of Examples 18 or 19 may optionally further include, wherein the first periodic training field and the second periodic training field are short training fields.

In Example 21, the subject matter of Examples 18 to 20 may optionally further include, wherein the first periodic training field is a long training field and the second periodic training field is a short training field.

In Example 22, the subject matter of Examples 18 to 21 may optionally further include, wherein the first periodic training field is a short training field and the second periodic training field is a long training field.

In Example 23, the subject matter of Examples 18 to 22 may optionally further include, wherein the first spurious tone parameter is an amplitude of the spurious tone.

In Example 24, the subject matter of Examples 18 to 23 may optionally further include, wherein the first spurious tone parameter is a phase of the spurious tone.

In Example 25, the subject matter of Examples 18 to 24 may optionally further include, wherein the first spurious tone parameter is a frequency of a spurious tone.

In Example 26, the subject matter of Examples 18 to 25 may optionally further include, wherein the frequency of the spurious tone is known.

In Example 27, the subject matter of Examples 18 to 26 may optionally further include, comparing the transmission frame at a first time and the transmission frame at a second time; and determining a variation of the transmission frame based on the comparison.

In Example 28, the subject matter of Examples 18 to 27 may optionally further include, wherein the second spurious tone parameter is further based on a variation of the transmission frame between the first time and the second time.

In Example 29, the subject matter of Examples 18 to 28 may optionally further include, wherein the second spurious tone parameter is an amplitude of the spurious tone.

In Example 30, the subject matter of Examples 18 to 29 may optionally further include, wherein the second spurious tone parameter is a phase of the spurious tone.

In Example 31, the subject matter of Examples 18 to 30 may optionally further include, wherein the second spurious tone parameter is a frequency of a spurious tone.

In Example 32, the subject matter of Examples 18 to 31 may optionally further include, adjusting a center frequency of a further data packet based on the frequency adjustment.

In Example 33, the subject matter of Examples 18 to 32 may optionally further include, wherein the frequency adjustment is based on the frequency of the spurious tone and a frequency offset of a transmitter.

In Example 34, one or more non-transitory computer readable media including programmable instructions thereon, that when executed by one or more processors of a device, cause the device to perform any one of the methods of claims 18 to 33.

In Example 35, a system including one or more devices according to any of claims 1 to 17, the system configured to implement a method according to any of claims 18 to 33.

In Example 36, a means for implementing any of the claims 1 to 17.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An apparatus of a Wi-Fi station (STA), the apparatus including a radio frequency (RF) interface, and one or more processors coupled to the RF interface configured to:
   receive a first periodic training field and a second periodic training field of a preamble of a data packet;
   compare the first periodic training field of the preamble with the second periodic training field of the preamble;
   determine a first spurious tone parameter based on the comparison;
   receive a transmission frame of the data packet;
   determine a second spurious tone parameter based on the transmission frame of the data packet; and
   generate a frequency adjustment based on the first spurious tone parameter and the second spurious tone parameter.

2. The apparatus of claim 1, wherein the first periodic training field and the second periodic training field are long training fields.

3. The apparatus of claim 1, wherein the first periodic training field and the second periodic training field are short training fields.

4. The apparatus of claim 1, wherein the first spurious tone parameter is an amplitude of a spurious tone.

5. The apparatus of claim 1, wherein the first spurious tone parameter is a phase of a spurious tone.

6. The apparatus of claim 1, wherein the first spurious tone parameter is a frequency of a spurious tone.

7. The apparatus of claim 6, wherein the frequency of the spurious tone is a predetermined value.

8. The apparatus of claim 1, wherein the second spurious tone parameter is further based on a comparison of the transmission frame at a first time and the transmission frame at a second time.

9. The apparatus of claim 1, wherein the second spurious tone parameter is an amplitude of a spurious tone.

10. The apparatus of claim 1, wherein the second spurious tone parameter is a phase of a spurious tone.

11. The apparatus of claim 1, wherein the second spurious tone parameter is a frequency of a spurious tone.

12. The apparatus of claim 1, further configured to adjust a center frequency of a further data packet based on the frequency adjustment.

13. The apparatus of claim 12, wherein the frequency adjustment is based on the frequency of a spurious tone corresponding to the first spurious tone parameter and a frequency offset of a transmitter.

14. The apparatus of claim 1, further comprising a radio frequency (RF) phase locked loop (PLL) configured to determine a frequency offset of the frequency adjustment.

15. A method comprising:
   receiving a first periodic training field and a second periodic training field of a preamble of a data packet;
   comparing the first periodic training field of the preamble with the second periodic training field of the preamble;
   determining a first spurious tone parameter based on the comparison;
   receiving a transmission frame of the data packet;
   determining a second spurious tone parameter of the transmission frame; and
   generating a frequency adjustment based on the first spurious tone parameter and the second spurious tone parameter.

16. The method of claim 15, wherein the first periodic training field and the second periodic training field are long training fields.

17. The method of claim 16, wherein the first spurious tone parameter is a phase of a spurious tone.

18. The method of claim 17, wherein the second spurious tone parameter is an amplitude of the spurious tone.

19. The method of claim 16, further comprising adjusting a center frequency of a further data packet based on the frequency adjustment.

20. The method of claim 19, wherein the first spurious tone parameter is a frequency of a spurious tone, and wherein the frequency adjustment is based on the frequency of the spurious tone and a frequency offset of a transmitter.

* * * * *